(12) United States Patent
Lee (10) Patent No.: US 7,916,780 B2
(45) Date of Patent: Mar. 29, 2011

(54) ADAPTIVE EQUALIZER FOR USE WITH CLOCK AND DATA RECOVERY CIRCUIT OF SERIAL COMMUNICATION LINK

(75) Inventor: Bong-Joon Lee, Seoul (KR)

(73) Assignee: Synerchip Co. Ltd, Hsinchu (TW)

( * ) Notice: Subject to any disclaimer, the term of this patent is extended or adjusted under 35 U.S.C. 154(b) by 639 days.

(21) Appl. No.: 11/865,621

(22) Filed: Oct. 1, 2007

(65) Prior Publication Data

US 2008/0247452 A1  Oct. 9, 2008

Related U.S. Application Data

(60) Provisional application No. 60/910,773, filed on Apr. 9, 2007.

(51) Int. Cl.
*H03K 5/159* (2006.01)
(52) U.S. Cl. ........ 375/232; 375/233; 375/294; 375/373; 375/377; 375/371
(58) Field of Classification Search ............... 375/232, 375/233, 294, 373, 377, 371
See application file for complete search history.

(56) References Cited

U.S. PATENT DOCUMENTS

| | | | | |
|---|---|---|---|---|
| 5,867,542 | A * | 2/1999 | Iwamatsu et al. | 375/354 |
| 2004/0119548 | A1 * | 6/2004 | Karlquist | 332/112 |
| 2006/0291551 | A1 * | 12/2006 | Goth | 375/232 |
| 2007/0002942 | A1 * | 1/2007 | Simpson et al. | 375/229 |
| 2008/0069276 | A1 * | 3/2008 | Wong et al. | 375/350 |

OTHER PUBLICATIONS

Alexander, J., "Clock Recovery from Random Binary Signals," Electronic Letters, Oct. 30, 1975, pp. 541-542, vol. 11, No. 22.
Choi, J. et al., "A CMOS 3.5Gbps Continuous-time Adaptive Cable Equalizer with Joint Adaptation Method of Low-Frequency Gain and High-Frequency Boosting," IEEE 2003 Symposium on VLSI Circuits Digest of Technical Papers, Jun. 2003, pp. 103-106.
Gu, R. et al., "A 0.5-3.5 Gb/s Low-power Low-jitter Serial Data CMOS Transceiver," 1999 IEEE International Solid-State Circuits Conference Digest of Technical Papers, Feb. 1999, pp. 352-353, 478.
Lee, B. et al., "A 2.5-10 Gb/s CMOS Transceiver with Alternating Edge-Sampling Phase Detection for Loop Characteristic Stabilization," IEEE Journal of Solid State Circuits, Nov. 2003, pp. 1821-1829, vol. 38, No. 11.
Lee, J. et al, "A 250 MHz Low Jitter Adaptive Bandwidth PLL," 1999 IEEE International Solid-State Circuits Conference Digest of Technical Papers, Feb. 1999, pp. 346-347, 477.
Maneatis, J., "Low-Jitter Process-Independent DLL and PLL Based on Self-Biased Techniques," IEEE Journal of Solid-State Circuits, Nov. 1996, pp. 1723-1732, vol. 31, No. 11.

* cited by examiner

*Primary Examiner* — Shuwang Liu
*Assistant Examiner* — Kabir A Timory
(74) *Attorney, Agent, or Firm* — Elizabeth Kim (57) ABSTRACT

An adaptive equalizer system for use in a serial communication link uses timing information generated by a phase detector of a clock and data recovery circuit of the serial communication link and a frequency pattern of the recovered data to determine whether the data received over the serial communication link is over-equalized or under-equalized. The equalizer strength of the adaptive equalizer system is adjusted based on such determination.

21 Claims, 6 Drawing Sheets

ADAPTIVE EQUALIZER FOR USE WITH CLOCK AND DATA RECOVERY CIRCUIT OF SERIAL COMMUNICATION LINK

CROSS-REFERENCE TO RELATED APPLICATION

This application claims priority under 35 U.S.C. §119(e) from co-pending U.S. Provisional Patent Application No. 60/910,773, entitled "Low Jitter, Wide Range Clock and Data Recovery Circuit with Continuous-Time Adaptive Equalizer" filed on Apr. 9, 2007, which is incorporated by reference herein in its entirety.

BACKGROUND OF THE INVENTION

1. Field of the Invention

The present invention relates to an adaptive equalizer for use with a clock and data recovery (CDR) circuit of a serial communication link.

2. Description of the Related Arts

Serial communication links, such as HDMI (High-Definition Multimedia Interface), DVI (Digital Video Interface), UDI (Unified Display Interface), PCI-Express, Fiber Channel, Ethernet, etc., are widely used to transmit digital data from a transmitter to a receiver over a physical cable. For example, HDMI communication links transmit digital video and audio data from the transmitter to the receiver over a physical cable, and typically use a CDR circuit at the receiver to recover the differential NRZ (Non-Return to Zero) data and clock signals transmitted from the transmitter. Because the physical cable often exhibits the characteristics of a low-pass filter, the NRZ data received at the receiver for recovery by the CDR circuit typically have different amplitudes depending upon the frequency, which causes noise to be present in the recovered NRZ data.

Equalizers have been used with the CDR circuit to compensate for the different amplitudes of the NRZ data depending upon the frequency. Conventional equalizers attempt to equalize the NRZ data received at the receiver by equalizing the amplitudes at different frequencies of the NRZ data. Most conventional adaptive equalizers use an analog comparator or a digital comparator combined with an analog-to-digital converter (ADC) to examine the eye diagram of the NRZ data. However, such conventional equalizers require very complicated circuitry to implement, require a lot of hardware resources, and still fail to effectively remove jitter caused by timing misalignment and dispersion of the NRZ data depending upon the different frequencies of the NRZ data.

Therefore, there is a need for an equalizer that can remove effectively jitter in the different frequencies of the NRZ data. There is also a need for an equalizer that can be implemented with simple circuitry.

SUMMARY OF THE INVENTION

Embodiments of the present invention include an adaptive equalizer system for use in a serial communication link, in which timing information associated with the NRZ data as generated by a phase detector of a CDR circuit of the serial communication link and a frequency pattern of the recovered NRZ data is used to determine whether the NRZ data received over the serial communication link is over-equalized or under-equalized. The equalizer strength of the adaptive equalizer system is adjusted based on such determination. In one embodiment, an adaptive equalizer system is provided, where the adaptive equalizer system comprises an equalizer receiving data over a serial communication link and adjusting an amplitude of the data across a frequency range of the data to generate equalized data, a phase detector coupled to the equalizer and receiving the equalized data and generating recovered data together with timing data indicating timing of the recovered data with respect to a reference clock timing, and a decoder decoding the recovered data and the timing data to generate a first equalizer adjustment signal indicating that an equalizer strength of the equalizer is to be increased or decreased based upon the timing data and a frequency pattern of the recovered data.

In one embodiment, the phase detector generates the timing data to be in a first state if the reference clock timing occurs earlier than a transition of the recovered data and to be in a second state if the reference clock timing occurs later than the transition of the recovered data. The recovered data is in an under-equalized state if the timing data corresponding to a high frequency pattern of the recovered data is in the first state and/or the timing data corresponding to a low frequency pattern of the recovered data is in the second state. The recovered data is in an over-equalized state if the timing data corresponding to a high frequency pattern of the recovered data is in the second state and/or the timing data corresponding to a low frequency pattern of the recovered data is in the first state. The decoder sets the first equalizer adjustment signal to have a same state as the timing data, responsive to a high frequency pattern of the recovered data. The decoder sets the first equalizer adjustment signal to have an opposite state of the timing data, responsive to a low frequency pattern of the recovered data.

In one embodiment, the adaptive equalizer system further comprises an accumulation module coupled to the decoder and the equalizer. The accumulation module accumulates the first equalizer adjustment signal to generate a second equalizer adjustment signal for controlling the equalizer strength of the equalizer. The second equalizer adjustment signal indicates an increase of the equalizer strength if an accumulated count of the first equalizer adjustment signal exceeds a first predetermined threshold, and indicates a decrease of the equalizer strength if the accumulated count of the first equalizer adjustment signal becomes lower than a second predetermined threshold. The equalizer comprises a plurality of amplifier stages, and the DC gain of each of the amplifier stages is adjusted by the second equalizer adjustment signal.

The adaptive equalizer system of the present invention has the advantage that the existing phase detector of a clock and data recovery circuit is used to determine data timing information and thus does not require separate circuitry, thereby saving cost and design effort. The adaptive equalizer of the present invention can effectively remove jitter in the data received over the serial communication link without complicated circuitry. Since the equalizer strength is changed in response to accumulated changes in the data timing information, abrupt, temporary changes in the data timing information would not necessarily result in change of the equalizer strength. As a result, equalization of the data is accomplished smoothly.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
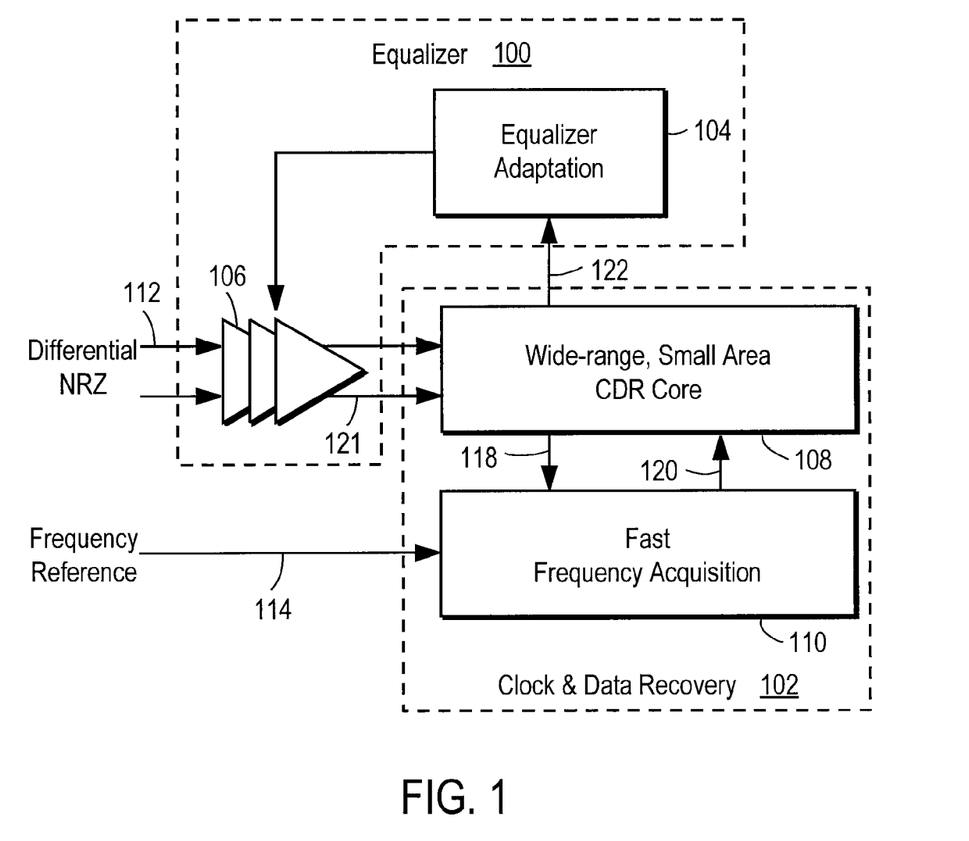
FIG. 1 is a block diagram illustrating an adaptive equalizer used with a clock and data recovery (CDR) circuit, according to one embodiment of the present invention.

FIG. 1 is a block diagram illustrating an adaptive equalizer 100 used with a clock and data recovery (CDR) circuit 102, according to one embodiment of the present invention. The CDR circuit 102 may be used with HDMI links as well as other types of serial communication links. The continuous-time adaptive equalizer 100 includes an equalizer core 106 and an equalizer adaptation module 104. The CDR circuit 102 includes a CDR core 108 and a fast frequency acquisition circuit 110.

As will be explained in more detail below, the equalizer adaptation module 104 adjusts 116 the equalization coefficients affecting the gain of the equalization core 106, based on NRZ data timing information 122 provided by the CDR core 108. The equalization core 106 adjusts the amplitude of the differential NRZ signals 112 to generate the equalized NRZ data 121 for use with the CDR core 108. As will be shown in more detail below, the equalizer 100 can remove jitter in the different frequencies of the differential NRZ data 112 effectively, using simple circuitry and the NRZ timing information 122 generated by the CDR core 108. Note that the equalizer according to the present invention can be used to equalize non-differential data, although the disclosure herein illustrates the example of equalizing differential NRZ data using the equalizer of the present invention.

The CDR circuit 102 has a wide-range, small area CDR core 108. The CDR core 108 receives the equalized NRZ data 121 and efficiently recovers clock and data signals based on the equalized, differential NRZ data 121 by use of a mix of digital and analog loop filter circuitry. As will be explained in more detail with reference to FIGS. 3 and 4, the CDR core 108 generates NRZ timing information 122 for use by the equalizer adaptation module 104. The fast frequency acquisition circuit 110 acquires a frequency reference 114 for use by the CDR core 108 using an operation clock signal 118 recovered by the CDR core 108. The frequency acquisition circuit 110 helps the CDR core 108 tune its center frequency to the reference clock frequency 114 by comparing the CDR clock frequency with the reference clock frequency 114. The fast frequency acquisition circuit 110 also generates a CDR core activation signal 120 and other signals used by the CDR core 108. The internal circuitry of the CDR circuit 102, other than the 2×-oversampling Alexander phase detector (or Bang-Bang phase detector (hereinafter, "BB PD")) shown in FIG. 2, is not the subject of the present invention and thus is not described herein in detail.

Figure 2:
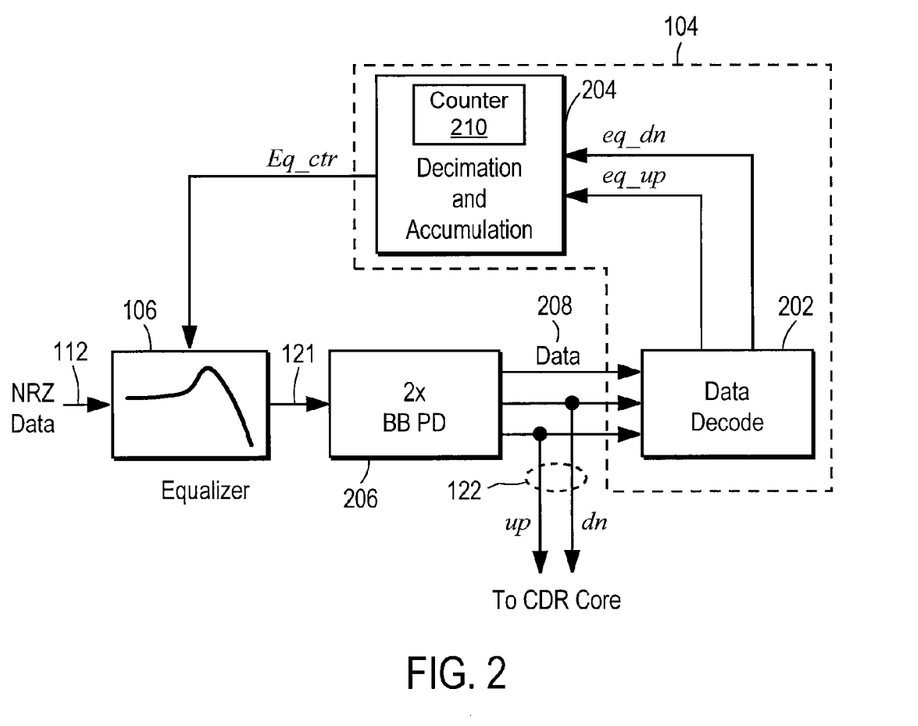
FIG. 2 is a block diagram illustrating the adaptive equalizer in more detail, used with the 2×-oversampling Alexander phase detector (2×-oversampling Bang Bang phase detector) of the CDR circuit, according to one embodiment of the present invention.

FIG. 2 is a block diagram illustrating the adaptive equalizer in more detail, used with the 2×-oversampling Alexander phase detector (2×-oversampling Bang Bang phase detector) 206 of the CDR, according to one embodiment of the present invention. The equalizer core 106 receives the differential NRZ data 112 and provides the 2×BB PD 206 of the CDR core 108 with the equalized, differential NRZ data 121. As will be explained in more detail below with reference to FIGS. 3 and 4, the BB PD 206 recovers the NRZ data 208 and generates NRZ timing information 122 (up/dn data) indicating the timing of the edge clock compared to the center clock in the recovered NRZ data 208. The data decode block 202 decodes the up/dn NRZ timing information 122 and the data pattern 208, and determines whether the up/dn NRZ timing information 122 and the data pattern 208 indicate a need to increase the equalization coefficient (equalization strength) (i.e., eq_up=1, eq_dn=0) or a need to decrease the equalization coefficient (i.e., eq_up=0, eq_dn=1). The decimation and accumulation module 204 receives the eq_up and eq_dn signals. The decimation and accumulation module 204 includes an up/down counter (digital accumulator) 210 that accumulates the eq_up and eq_dn data by increasing the count if eq_up=1 and eq_dn=0 and by decreasing the count if eq_up=0 and eq_dn=1.

The decimation and accumulation module 204 changes the value of the equalizer coefficient Eq_ctr when an overflow in the counter 210 occurs. For example, the decimation and accumulation module 204 increases the equalizer coefficient Eq_ctr when the count exceeds a predetermined threshold, and the count is reset to zero. For another example, the decimation and accumulation module 204 decreases the equalizer coefficient Eq_ctr when the count becomes lower than another predetermined threshold, and the count is reset to zero. This way, the equalizer coefficient Eq_ctr changes in response to accumulated changes in the NRZ data timing information, and abrupt, temporary changes in the NRZ data timing information would not necessarily result in a change of the equalizer coefficient Eq_ctr. The equalizer core 106 adjusts the amplitude of the differential NRZ data 112. The gain of the equalizer core 106 is adjusted based upon the equalizer coefficient Eq_ctr provided by the decimation and accumulation module 204, which is explained in further detail with reference to FIG. 6.

Figure 3:
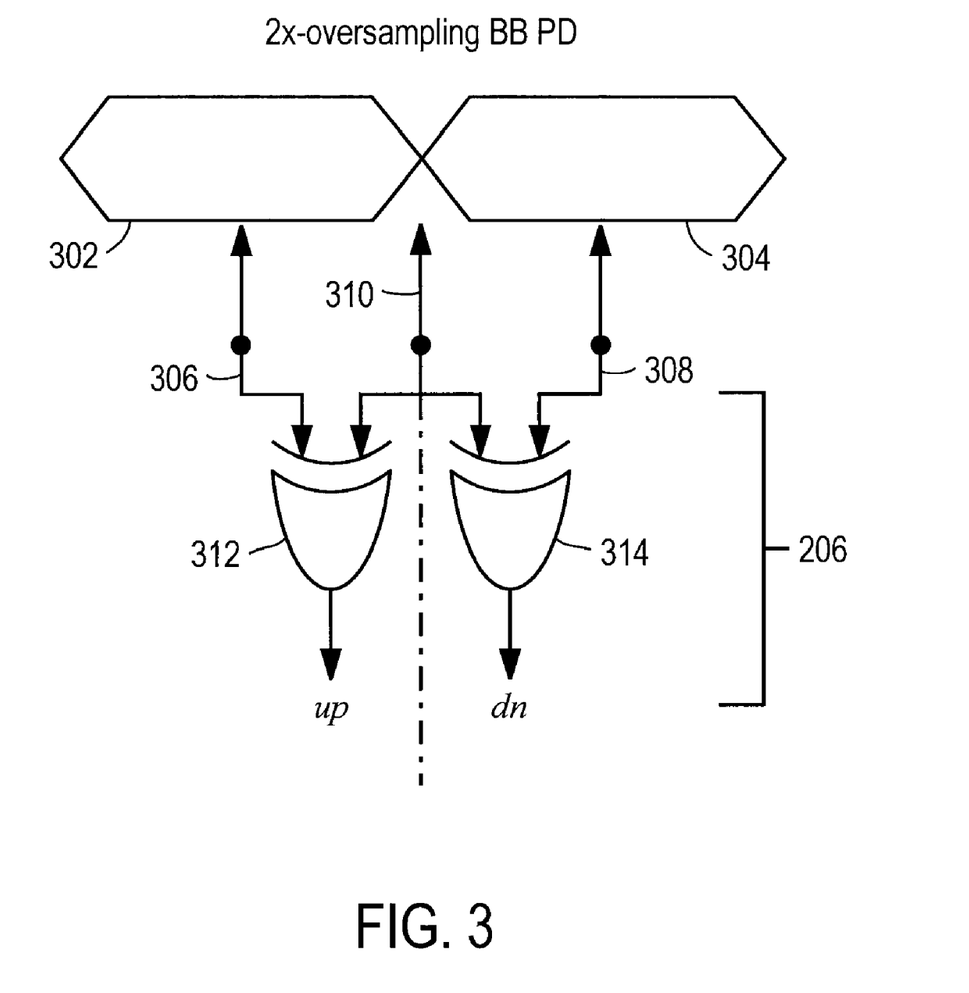
FIG. 3 illustrates the 2×-oversampling Bang Bang phase detector used with the adaptive equalizer, according to one embodiment of the present invention.

FIG. 3 conceptually illustrates the 2×-oversampling Bang Bang phase detector 206 used with the adaptive equalizer, according to one embodiment of the present invention. As explained above, the BB PD 206 generates NRZ data timing information (up, dn) based on the recovered NRZ data 208 sampled at the timing of the edge clock 310 compared to the recovered NRZ data 208 sampled at the center clocks 306, 308. The center clocks 306, 308 are clock signals timed at the center of the data 302, 304 of the recovered NRZ data 208. The edge clock 310 is at the middle of the center clocks 306, 308, and corresponds to the CDR lock position.

The BB PD 206 includes XOR gates 312, 314 each generating the up, dn data, respectively. The XOR gate 312 receives and conducts XOR (exclusive OR) operation on the value of the recovered NRZ data 302 sampled at the center clock 306 and the value of the recovered NRZ data (302 or 304) sampled at the edge clock 310 to generate the up data for two successive instances of the NRZ data 302, 304. Similarly, the XOR gate 314 receives and conducts XOR (exclusive OR) operation on the value of the recovered NRZ data 304 sampled at the center clock 308 and the value of the recovered NRZ data (302 or 304) sampled at the edge clock 310 to generate the up data for two successive instances of the NRZ data 302, 304.

With the aforementioned structure, the BB PD 206 is capable of determining whether the timing of the NRZ data leads or lags behind the clock signals, especially at the edge clock 310. For example, if the recovered NRZ data 302, 304 leads the clock signals (i.e., the clock signals are tilted left compared to the NRZ data and thus the edge clock 310 occurs earlier than the transition of the recovered NRZ data 302, 304), the center clock 306 and the edge clock 310 would both sample the NRZ data 302 but the center clock 308 would sample the NRZ data 304. Thus, the XOR gate 312 would generate up=0 and the XOR gate 314 would generate dn=1. On the other hand, if the recovered NRZ data 302, 304 lags the clock signals (i.e., the clock signals are tilted right compared to the NRZ data and thus the edge clock 310 occurs later than the transition of the recovered NRZ data 302, 304), the center clock 306 would sample the NRZ data 302, but both the edge clock 310 and the center clock 308 would sample the NRZ data 304. Thus, the XOR gate 312 would generate up=1 and the XOR gate 314 would generate dn=0.

The significance of the up/dn NRZ timing information 122 differs depending upon whether the recovered NRZ data pattern 208 is a high frequency (transition) pattern or a low frequency (transition) pattern. The term "high frequency pattern" or "high frequency transition pattern" herein refers to a sequence of data where there is data transition immediately preceding the current data transition of interest, and the term "low frequency pattern" or "low frequency transition pattern" herein refers to a sequence of data where there is no data transition immediately preceding the current data transition of interest. For example, a data pattern such as '101' is a high frequency pattern because there is data transition (from 1 to 0) immediately preceding the current (latest) data transition (from 0 to 1) of interest. A data pattern such as '010' is also a high frequency pattern because there is data transition (from 0 to 1) immediately preceding the current (latest) data transition (from 1 to 0) of interest. For another example, a data pattern such as '001' is a low frequency pattern because there is no data transition (from 0 to 0) immediately preceding the current (latest) data transition (from 0 to 1) of interest. A data pattern such as '110' is also a low frequency pattern because there is no data transition (from 1 to 1) immediately preceding the current (latest) data transition (from 1 to 0) of interest.

Depending on the equalization strength of the equalization core 106, the high-frequency ('010' or '101') and the low-frequency ('001' or '110') data transitions are dispersed in different ways. The equalizer adaptation module 104 estimates whether to increase or decrease the equalization strength of the equalization core 106 by observing the data pattern-dependent up/dn profiles of the recovered NRZ data 208.

Figure 4:
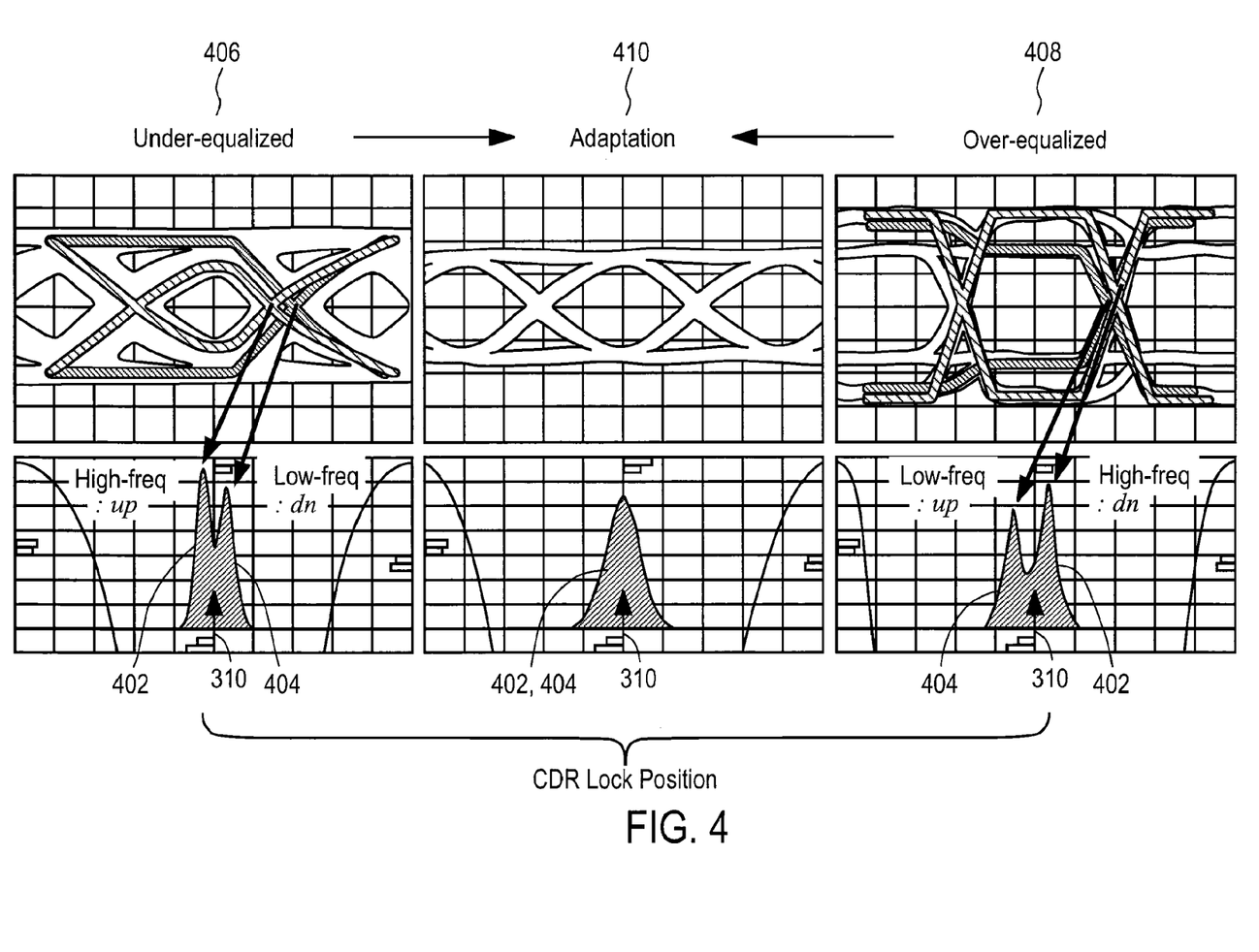
FIG. 4 illustrates how the equalization conditions are determined with an input eye diagram, according to one embodiment of the present invention.

FIG. 4 illustrates how the equalization conditions are determined with an input eye diagram (also known as an eye pattern), according to one embodiment of the present invention. In the eye diagram, a data transition histogram shows the timing relations between high-frequency patterns and low-frequency patterns in each of an under-equalized condition 406, an optimally-equalized condition 408, and an over-equalized conditions 408. As shown in the data transition histogram, the relative positions of the high-frequency transition, the low-frequency transition, and the CDR lock position are determined by the equalization status. Such equalization status is detected by the BB PD 206 (See FIGS. 2 and 3) by determining such timing relation. If the BB PD 206 predominantly generates up=1 and dn=0 for high frequency patterns 402 with respect to the edge clock 310 and/or predominantly generates up=0 and dn=1 for low frequency patterns 404 with respect to the edge clock 310, this means that the NRZ data 121 is under-equalized 406 and that the equalization coefficient Eq_ctr may be lower than optimal and may have to be increased. If the BB PD 206 predominantly generates up=0 and dn=1 for high frequency patterns 402 and/or predominantly generates up=1 and dn=0 for low frequency patterns 404 with respect to the edge clock 310, this means that the NRZ data 121 is over-equalized 408 and that the equalization coefficient Eq_ctr may be higher than optimal and may have to be decreased. If the BB PD 206 predominantly generates equal amounts of up=1 and dn=1 with respect to the edge clock 310 for both high frequency patterns 402 and/or low frequency patterns, this means that complete, optimal adaptation 410 has been accomplished and that no change to the equalization coefficient Eq_ctr is necessary.

Thus, referring back to FIGS. 2 and 3, the data decode module 202 decodes the recovered NRZ data 208, and the NRZ data timing information (up, down) 122 and generates eq_up and eq_dn signals indicating under-equalization, over-equalization, respectively, of the recovered NRZ data 208, as follows:

(i) If the NRZ data 208 indicates a high frequency pattern, eq_up=up and eq_dn=dn.
(ii) If the NRZ data 208 indicates a low frequency pattern, eq_up=dn and eq_dn=up.
(iii) If there is no current data transition in the NRZ data 208, eq_up=0 and eq_dn=0.

As a result, eq_up=up=1 and eq_dn=dn=0 for a high frequency pattern that is under-equalized, and the decimation and accumulation module 204 increases the count of the counter 210 moving the count closer toward increasing the equalization coefficient Eq_ctr. Eq_up=up=0 and eq_dn=dn=1 for a high frequency pattern that is over-equalized, and the decimation and accumulation module 204 decreases the count of the counter 210 moving the count closer toward decreasing the equalization coefficient Eq_ctr. Eq_up=dn=1 and eq_dn=up=0 for a low frequency pattern that is under-equalized, and the decimation and accumulation module 204 increases the count of the counter 210 moving the count closer toward increasing the equalization coefficient Eq_ctr. Eq_up=dn=0 and eq_dn=up=1 for a low frequency pattern that is over-equalized, and the decimation and accumulation module 204 decreases the count of the counter 210 moving the count closer toward decreasing the equalization coefficient Eq_ctr.

As explained above, the decimation and accumulation module 204 changes the value of the equalizer coefficient Eq_ctr when an overflow in the counter occurs. For example, the decimation and accumulation module 204 increases the equalizer coefficient Eq_ctr when the count of the counter 210 exceeds a first predetermined threshold, and the count is reset to zero. For another example, the decimation and accumulation module 204 decreases the equalizer coefficient Eq_ctr when the count of the counter 210 becomes lower than a second predetermined threshold lower than the first predetermined threshold, and the count is reset to zero. This way, the equalizer coefficient Eq_ctr changes in response to accumulated changes in the NRZ data timing information (up, dn), and abrupt, temporary changes in the NRZ data timing information (up, dn) would not necessarily result in a change of the equalizer coefficient Eq_ctr unless it is accumulated enough to exceed or become lower than the predetermined thresholds of the count.

To prevent instability caused by interaction between the CDR core 108 and the equalizer adaptation module 104, in one embodiment the equalizer adaptation module 104 is designed to have a very narrow bandwidth using the digital decimator and accumulator 204. Also in one embodiment, for smooth convergence, the equalizer coefficient (Eq_ctr) is set to an externally configurable default value during the CDR frequency acquisition period, and released when the CDR core 108 is activated.

Figure 5:
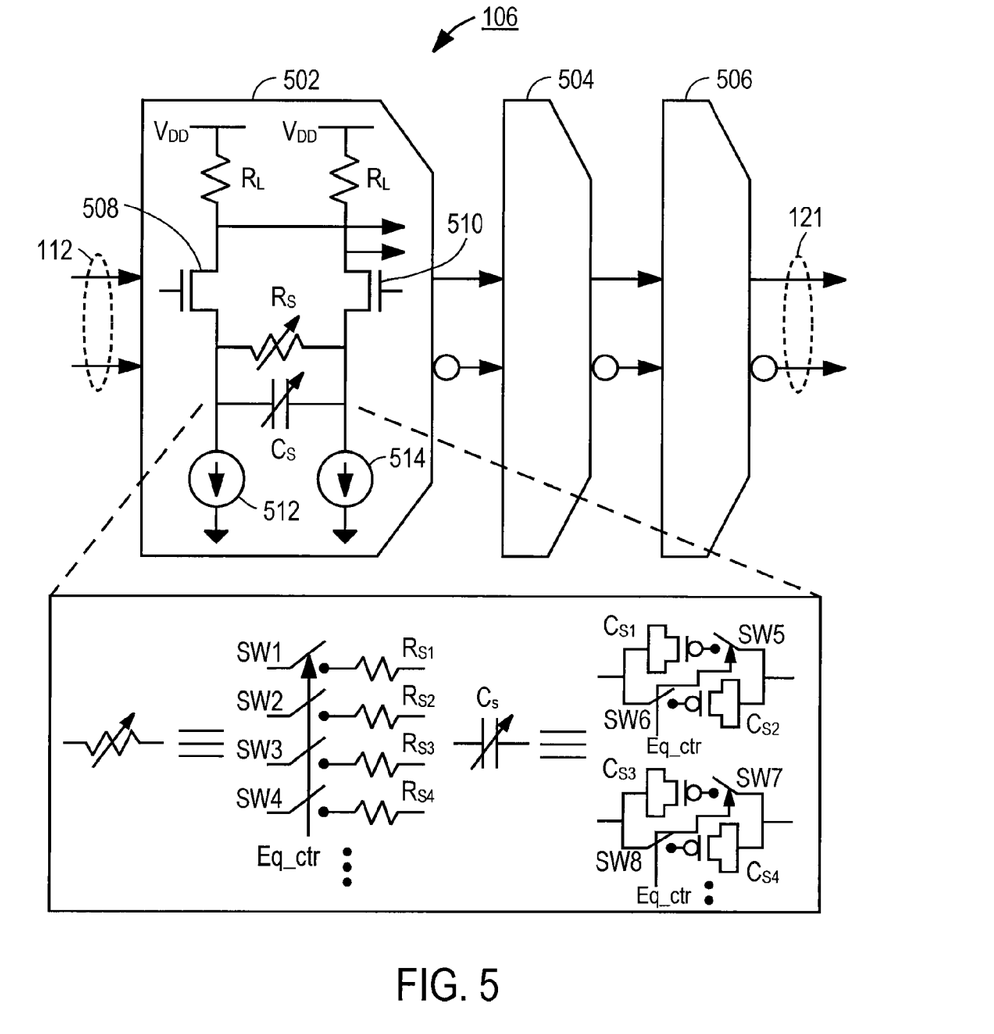
FIG. 5 illustrates the circuitry of the equalizer core, according to one embodiment of the present invention.

FIG. 5 conceptually illustrates the circuitry of the equalizer core 106 according to one embodiment of the present invention. The equalization core 106 includes a plurality of frequency-dependent source-degenerating amplifiers 502, 506, 506. Such structure of the amplifiers 502, 506, 506 are most suitable for one dimensional control of the equalization strength. Referring to FIG. 5, each amplifier stage 502, 506, 508 includes a pair of transistors 508, 510 coupled to the supply voltage $V_{DD}$ through resistors $R_L$, and to Ground through current sources 512, 514, respectively. The transistors 508, 510 are coupled through a variable resistor array $R_S$ and a variable capacitor array $C_S$ coupled to each other in parallel. As shown in FIG. 5, the variable resistor array $R_S$ includes a plurality of resistors $R_{S1}$, $R_{S2}$, $R_{S3}$, $R_{S4}$, that can be coupled to each other in parallel by switches SW1, SW2, SW3, SW4 each coupled in series to those resistors, respectively. The opening and closing of the switches SW1, SW2, SW3, SW4 can be controlled by the digital value of the equalizer coefficient Eq_ctr. The variable capacitor array $C_S$ includes a plurality of capacitors $C_{S1}$, $C_{S2}$, $C_{S3}$, $C_{S4}$, that can be coupled in parallel by switches SW5, SW6 SW7, SW8 each coupled in series to those capacitors, respectively. The opening and closing of the switches SW5, SW6, SW7, SW8 can be controlled by the digital value of the equalizer coefficient Eq_ctr.

Figure 6:
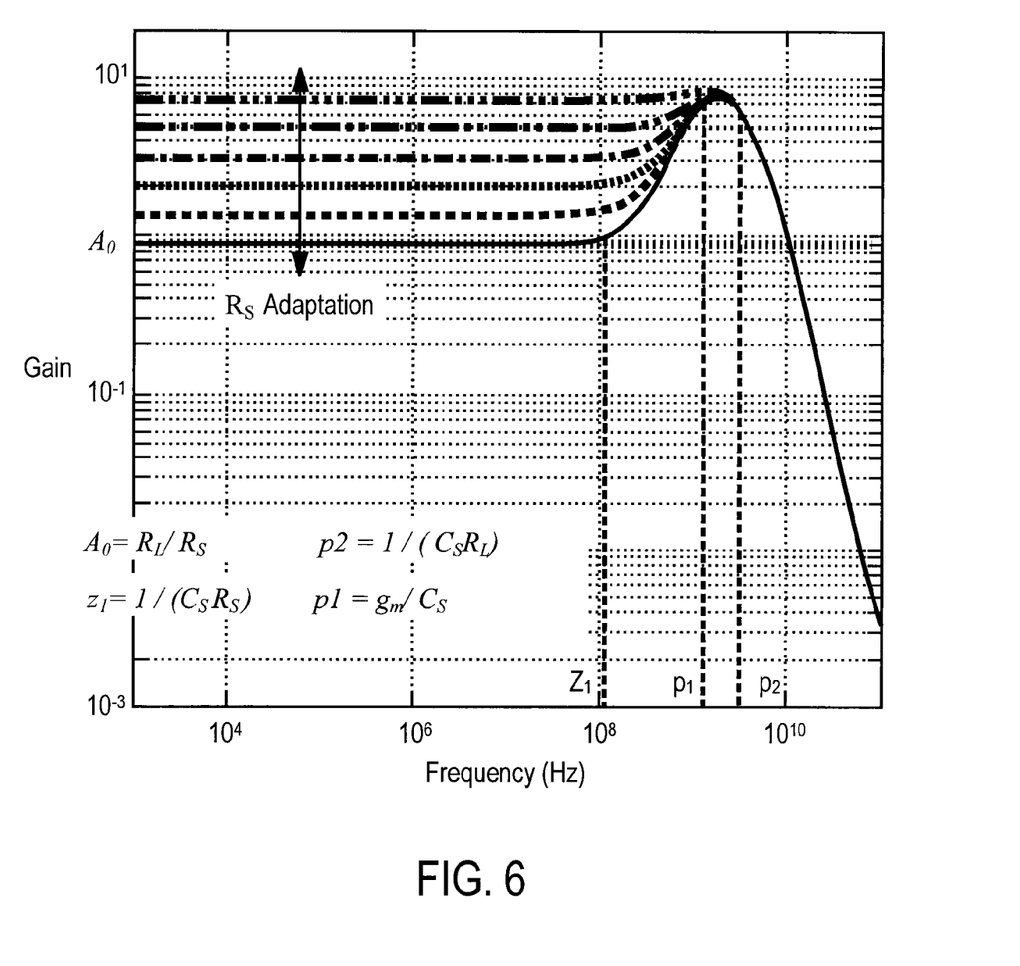
FIG. 6 illustrates how the gain of the equalizer core changes adaptively depending upon the determined equalization condition, according to one embodiment of the present invention.

The resistance value of the resistors $R_L$ and the variable resistor array $R_S$, and the capacitance of the variable capacitor array $C_S$ determine the DC gain, the pole locations, and zero location of each amplifier stage 502, 504, 506. FIG. 6 illustrates how the gain of the equalizer core changes adaptively depending upon the determined equalization condition, according to one embodiment of the present invention. As shown in FIG. 6, each amplifier stage 502, 504, 506 has characteristics defined by the following equations:

$$A_0 = R_L/R_S$$

$$z_1 = 1/(C_S \times R_S)$$

$$p_1 = g_m/C_S$$

$$p_2 = 1/(C_S \times R_L)$$

where $A_0$ is the DC gain of each amplifier stage 502, 504, 506, $z_1$ is the zero location of each amplifier stage 502, 506, 506, $p_1$, $p_2$ are the pole locations of each amplifier stage 502, 504, 506, and $g_m$ is the transconductance of the transistors 508, 510.

The zero location $z_1$ determines the frequency band to be boosted by the amplifier stages, while the DC gain $A_0$ controls the equalization strength. Once the data rate is determined, the zero location $z_1$ can be set via manual control or automatic band selection circuitry (not shown herein). Then, the equalizer adaptation module 104 adjusts the DC gain $A_0$ to obtain the maximum eye opening in the NRZ data pattern.

At a high level, since the DC gain $A_0$ is dependent upon the resistances $R_L$ and $R_S$, the DC gain of each amplifier stage 502, 504, 506 may be controlled by adjusting the value of the resistance $R_S$ using the equalizer coefficient Eq_ctr. Therefore, the switches SW1, SW2, SW3, SW4 in the variable resistor array $R_S$ are configured such that an increase in Eq_ctr results in an increase in the resistance $R_S$ and thus a decrease in the DC gain $A_0$. A decrease in the DC gain $A_0$ effectively results in a relative increase in the high frequency gain for the high frequency pattern. Thus, an increase in Eq_ctr results in a relative increase in the high frequency gain for the high frequency pattern relative to the low frequency gain for the low frequency pattern. On the other hand, a decrease in Eq_ctr results in a decrease in the resistance $R_S$ and a decrease in the DC gain $A_0$, and thus a relative decrease in the high frequency gain for the high frequency pattern relative to the low frequency gain for the low frequency pattern.

The adaptive equalizer of the present invention has the advantage that the existing BB PD of the CDR circuit is used for eye measure and to determine NRZ data timing information, and thus does not require separate circuitry, saving cost and design effort. The adaptive equalizer of the present invention can effectively remove jitter in the NRZ data without complicated circuitry. Since the equalizer coefficient Eq_ctr is changed in response to accumulated changes in the NRZ data timing information (up, dn), abrupt, temporary changes in the NRZ data timing information (up, dn) would not necessarily result in a change of the equalizer coefficient Eq_ctr. As a result, equalization of the NRZ data is accomplished smoothly. The equalizer circuit of the present invention may be used with any type of serial communication link, such as HDMI, UDI, or PCI-Express.

Upon reading this disclosure, those of skill in the art will appreciate still additional alternative structural and functional designs for an adaptive equalizer. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. An adaptive equalizer system, comprising:
   an equalizer receiving data over a serial communication link and adjusting an amplitude of the received data across a frequency range of the received data to generate equalized data;
   a phase detector coupled to the equalizer and receiving the equalized data and generating recovered data together with timing data indicating timing of the recovered data with respect to a reference clock timing; and
   a decoder decoding the recovered data and the timing data to generate a first equalizer adjustment signal indicating that an equalizer strength of the equalizer is to be increased or decreased based upon the timing data and a frequency pattern of the recovered data; and
an accumulation module coupled to the decoder and the equalizer, the accumulation module accumulating the first equalizer adjustment signal to generate a second equalizer adjustment signal for controlling the equalizer strength of the equalizer;
wherein the equalizer comprises a plurality of amplifier stages, each of the amplifier stages having a DC gain that is adjusted by the second equalizer adjustment signal.

2. The adaptive equalizer system of claim 1, wherein the phase detector generates the timing data to be in a first state if the reference clock timing occurs earlier than a transition of the recovered data and to be in a second state if the reference clock timing occurs later than the transition of the recovered data.

3. The adaptive equalizer system of claim 2, wherein the timing data comprises an up signal and a dn signal, the first state includes the up signal being set to "0" and the dn signal being set to "1" if the reference clock timing occurs earlier than the transition of the recovered data, and the second state includes the up signal being set to "1" and the dn signal being set to "0" if the reference clock timing occurs later than the transition of the recovered data.

4. The adaptive equalizer system of claim 3, wherein the phase detector comprises:
a first XOR gate configured to receive a first input sampling the recovered data at a first clock timing and a second input sampling the recovered data at a second clock timing to generate the up signal; and
a second XOR gate configured to receive the second input sampling the recovered data at the second clock timing and a third input sampling the recovered data at a third clock timing to generate the dn signal, the second clock timing occurring substantially at the center of the first clock timing and the third clock timing and serving as the reference clock timing.

5. The adaptive equalizer system of claim 2, wherein:
the recovered data is in an under-equalized state if the timing data corresponding to a high frequency pattern of the recovered data is in the first state or the timing data corresponding to a low frequency pattern of the recovered data is in the second state; and
the recovered data is in an over-equalized state if the timing data corresponding to a high frequency pattern of the recovered data is in the second state or the timing data corresponding to a low frequency pattern of the recovered data is in the first state.

6. The adaptive equalizer system of claim 5, wherein the first equalizer adjustment signal indicates an increase of the equalizer strength if the recovered data is in the under-equalized state and a decrease of the equalizer strength if the recovered data is in the over-equalized state.

7. The adaptive equalizer system of claim 2, wherein:
the decoder sets the first equalizer adjustment signal to have a same state as the timing data, responsive to a high frequency pattern of the recovered data.

8. The adaptive equalizer system of claim 2, wherein:
the decoder sets the first equalizer adjustment signal to have an opposite state of the timing data responsive to a low frequency pattern of the recovered data.

9. The adaptive equalizer system of claim 1,
wherein the second equalizer adjustment signal indicates an increase of the equalizer strength if an accumulated count of the first equalizer adjustment signal exceeds a first predetermined threshold and indicates a decrease of the equalizer strength if the accumulated count of the first equalizer adjustment signal becomes lower than a second predetermined threshold.

10. The adaptive equalizer system of claim 1, wherein the adaptive equalizer system is used with a clock and data recovery circuit of the serial communication link, and the phase detector forms a part of the clock and data recovery circuit.

11. The adaptive equalizer system of claim 1, wherein the received data is differential data.

12. An adaptive equalizer system, comprising:
an equalizer receiving data over a serial communication link and adjusting an amplitude of the received data across a frequency range of the received data to generate equalized data;
a phase detector coupled to the equalizer and receiving the equalized data and generating recovered data together with timing data indicating timing of the recovered data with respect to a reference clock timing;
a decoder decoding the recovered data and the timing data to generate a first equalizer adjustment signal indicating that an equalizer strength of the equalizer is to be increased or decreased based upon the timing data and a frequency pattern of the recovered data; and
an accumulation module coupled to the decoder and the equalizer, the accumulation module accumulating the first equalizer adjustment signal to generate a second equalizer adjustment signal for controlling the equalizer strength of the equalizer, the second equalizer adjustment signal indicating an increase of the equalizer strength if an accumulated count of the first equalizer adjustment signal exceeds a first predetermined threshold and indicating a decrease of the equalizer strength if the accumulated count of the first equalizer adjustment signal becomes lower than a second predetermined threshold,
wherein the equalizer comprises a plurality of amplifier stages, each of the amplifier stages having a DC gain that is adjusted by the second equalizer adjustment signal.

13. The adaptive equalizer system of claim 12, wherein each of the amplifier stages includes a variable resistor whose resistance is adjusted responsive to the second equalizer adjustment signal to control the DC gain of each of the amplifier stages.

14. An adaptive equalizer system, comprising:
an equalizer receiving data over a serial communication link and adjusting the amplitude of the received data across a frequency range of the received data to generate equalized data;
a phase detector coupled to the equalizer and receiving the equalized data and generating recovered data together with timing data indicating timing of the recovered data with respect to a reference clock timing, the timing data including an up signal and a dn signal, the up signal being set to a first state and the dn signal being set to a second state if the reference clock timing occurs earlier than a transition of the recovered data, and the up signal being set to the second state and the dn signal being set to the first state if the reference clock timing occurs later than the transition of the recovered data; and
a decoder decoding the recovered data and the timing data to generate a first equalizer adjustment signal including an eq_up signal and an eq_dn signal based upon the timing data and a frequency pattern of the recovered data, the eq_up signal indicating that an equalizer strength is to be increased if the eq_up signal is in the second state and the eq_dn signal indicating that the equalizer strength is to be decreased if the eq_dn signal is in the second state, the decoder setting the eq_up signal to be equal to the up signal and setting the eq_dn signal to be equal to the dn signal, responsive to a high frequency pattern of the recovered data; and the decoder setting the eq_up signal to be equal to the dn signal and setting the eq_dn signal to be equal to the up signal, responsive to a low frequency pattern of the recovered data;

and an accumulation module coupled to the decoder and the equalizer and generating a second equalizer adjustment signal for controlling the equalizer strength of the equalizer based on the eq_up signal and the eq_dn signal;

wherein the equalizer comprises a plurality of amplifier stages, each of the amplifier stages having a DC gain that is adjusted by the second equalizer adjustment signal.

15. The adaptive equalizer system of claim 14, wherein the phase detector comprises:

a first XOR gate configured to receive a first input sampling the recovered data at a first clock timing and a second input sampling the recovered data at a second clock timing to generate the up signal; and a second XOR gate configured to receive the second input sampling the recovered data at the second clock timing and a third input sampling the recovered data at a third clock timing to generate the dn signal, the second clock timing occurring substantially at the center of the first clock timing and the third clock timing and serving as the reference clock timing.

16. The adaptive equalizer system of claim 14, wherein the accumulation module increases a count responsive to the eq_up signal being in the second state and the eq_dn signal being in the first state, and decreases the count responsive to the eq_up signal being in the first state and the eq_dn signal being in the second state; and the second equalizer adjustment signal indicates an increase of the equalizer strength if the count exceeds a first predetermined threshold, and indicates a decrease of the equalizer strength if the count becomes lower than a second predetermined threshold.

17. The adaptive equalizer system of claim 14, wherein the adaptive equalizer system is used with a clock and data recovery circuit of the serial communication link and the phase detector forms a part of the clock and data recovery circuit.

18. The adaptive equalizer system of claim 14, wherein the received data is differential data.

19. An adaptive equalizer system, comprising:

an equalizer receiving data over a serial communication link and adjusting the amplitude of the received data across a frequency range of the received data to generate equalized data;

a phase detector coupled to the equalizer and receiving the equalized data and generating recovered data together with timing data indicating timing of the recovered data with respect to a reference clock timing, the timing data including an up signal and a dn signal, the up signal being set to a first state and the dn signal being set to a second state if the reference clock timing occurs earlier than a transition of the recovered data, and the up signal being set to the second state and the dn signal being set to the first state if the reference clock timing occurs later than the transition of the recovered data; and a decoder decoding the recovered data and the timing data to generate a first equalizer adjustment signal including an eq_up signal and an eq_dn signal based upon the timing data and a frequency pattern of the recovered data, the eq_up signal indicating that an equalizer strength is to be increased if the eq_up signal is in the second state and the eq_dn signal indicating that the equalizer strength is to be decreased if the eq_dn signal is in the second state, the decoder setting the eq_up signal to be equal to the up signal and setting the eq_dn signal to be equal to the dn signal, responsive to a high frequency pattern of the recovered data and the decoder setting the eq_up signal to be equal to the dn signal and setting the eq_dn signal to be equal to the up signal, responsive to a low frequency pattern of the recovered data;

wherein the accumulation module increases a count responsive to the eq_up signal being in the second state and the eq_dn signal being in the first state, and decreases the count responsive to the eq_up signal being in the first state and the eq_dn signal being in the second state; and the second equalizer adjustment signal indicates an increase of the equalizer strength if the count exceeds a first predetermined threshold, and indicates a decrease of the equalizer strength if the count becomes lower than a second predetermined threshold; and wherein the equalizer comprises a plurality of amplifier stages, each of the amplifier stages having a DC gain that is adjusted by the second equalizer adjustment signal.

20. The adaptive equalizer system of claim 19, wherein each of the amplifier stages includes a variable resistor whose resistance is adjusted responsive to the second equalizer adjustment signal.

21. The adaptive equalizer system of claim 19, wherein at least a DC gain, a zero location, and a pole location of each of the amplifier stages is adjusted responsive to the second equalizer adjustment signal.

* * * * *